United States Patent [19]

Carlton

[11] 4,445,030

[45] Apr. 24, 1984

[54] TRACKING ARRANGEMENT FOR A SOLAR ENERGY COLLECTING SYSTEM

[75] Inventor: Richard J. Carlton, Santa Clara, Calif.

[73] Assignee: Acurex Corporation, Mountain View, Calif.

[21] Appl. No.: 336,499

[22] Filed: Dec. 31, 1981

[51] Int. Cl.³ .............................................. G01J 1/20
[52] U.S. Cl. ................................. 250/203 R; 126/425
[58] Field of Search .................................. 126/424, 425; 250/203 R; 356/141, 142, 222, 220, 215

[56] References Cited

U.S. PATENT DOCUMENTS

| | | | |
|---|---|---|---|
| 3,700,905 | 10/1972 | Parkin et al. | 356/141 |
| 4,211,922 | 7/1980 | Vaerewyck et al. | 126/425 |
| 4,223,214 | 9/1980 | Dorian et al. | 250/203 R |
| 4,297,572 | 10/1981 | Carlton | 250/203 R |
| 4,361,758 | 11/1982 | Rotolo | 250/203 R |

*Primary Examiner*—David C. Nelms
*Assistant Examiner*—J. Brophy
*Attorney, Agent, or Firm*—Flehr, Hohbach, Test, Albritton & Herbert

[57] ABSTRACT

A solar energy collecting system of the tracking type is disclosed herein and includes at least one but preferably a plurality of solar panels mounted for movement along respective predetermined tracking paths such that each maintains a predetermined orientation with respect to the sun as the latter moves across the sky. The disclosed system also includes a single, common device which serves both as a direct insolation monitor for detecting the presence or absence of direct sunlight and as a means of detecting the position of the sun if direct sunlight is found to be present. Each panel includes a second device mounted for movement therewith for sensing the position of the panel at any given time and, at the same time, for detecting whether or not the panel is at the desired orientation with the sun. These latter devices cooperate with the first-mentioned common device for maintaining their associated solar panels in precise, controlled orientation with the sun so long as direct sunlight is present. The overall system also includes a remote arrangement for controlling the various solar panels in other prioritized ways utilizing "touch tone" signals, that is, dual tone multi-frequency (DTMF) signals.

30 Claims, 17 Drawing Figures

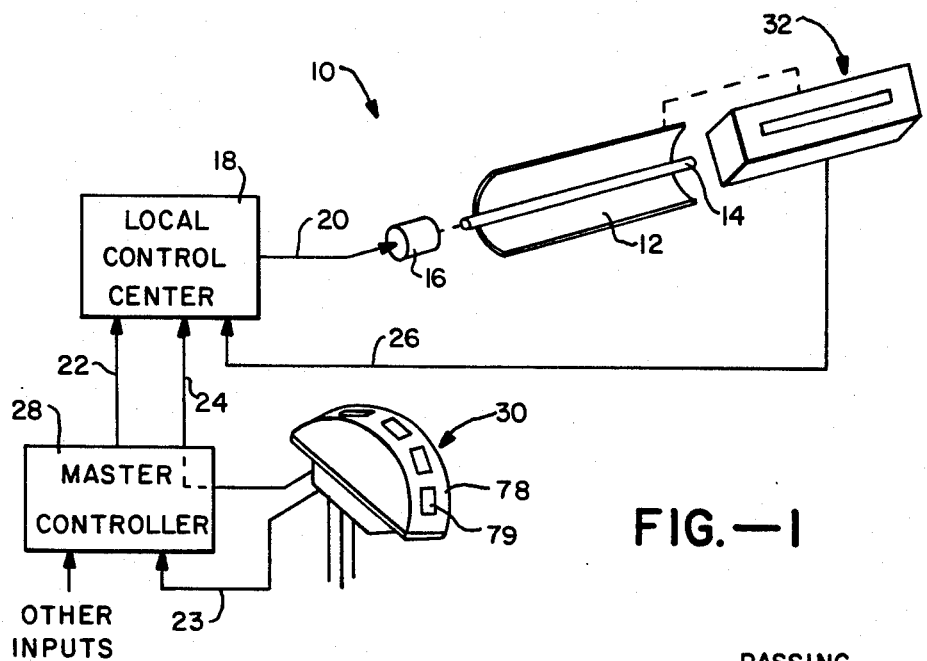
FIG.—1
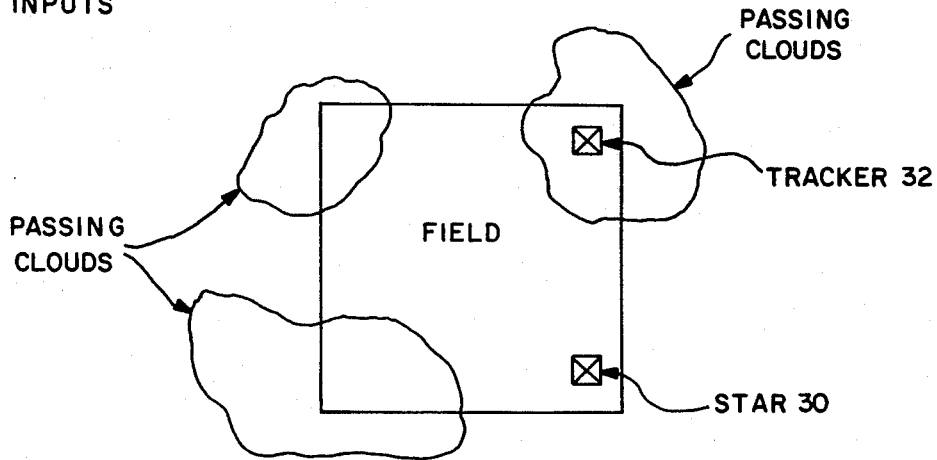
FIG.—2A
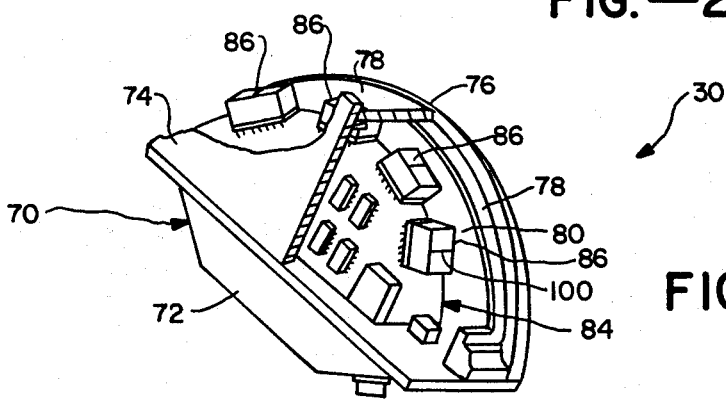
FIG.—3

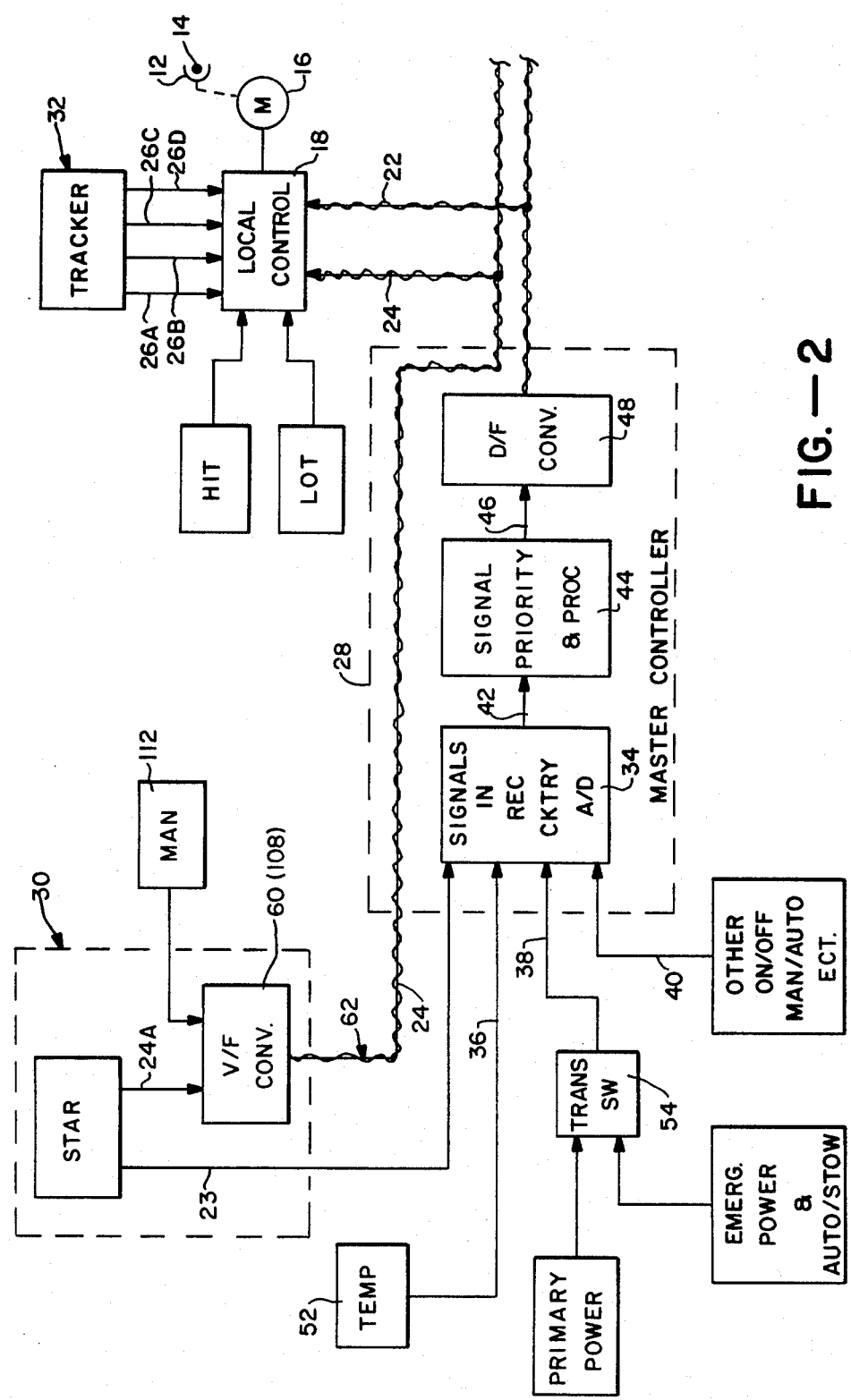
FIG.—2

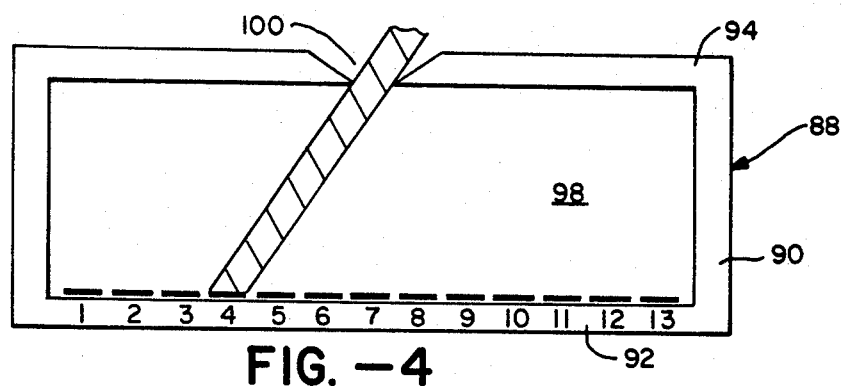
FIG.—4
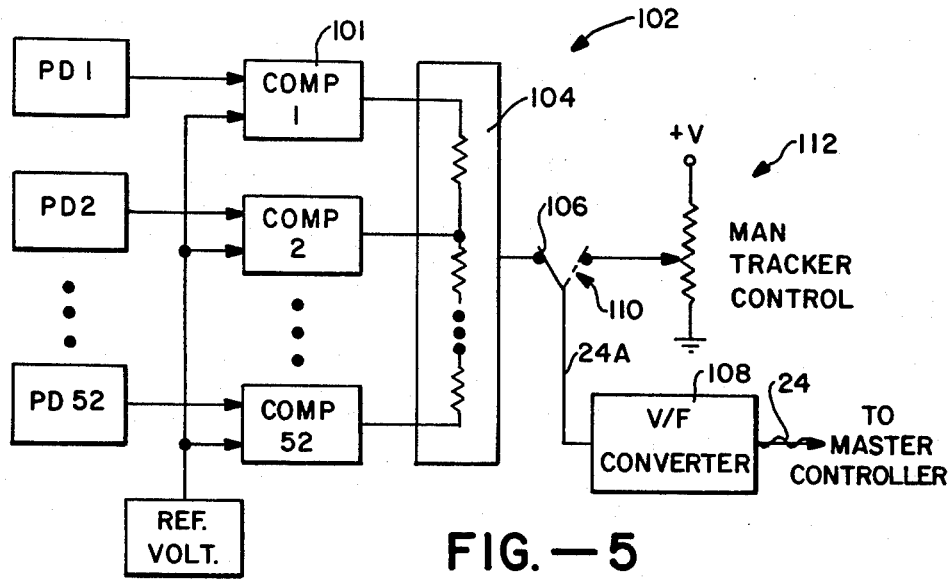
FIG.—5
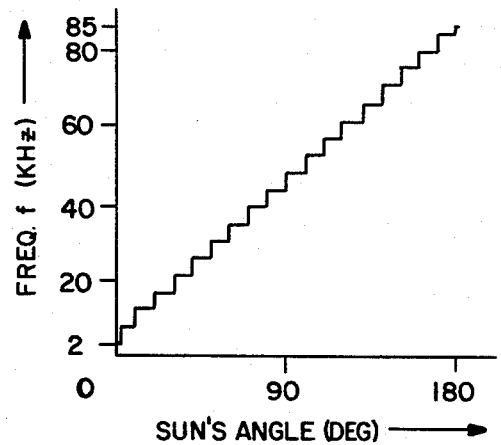
FIG.—6

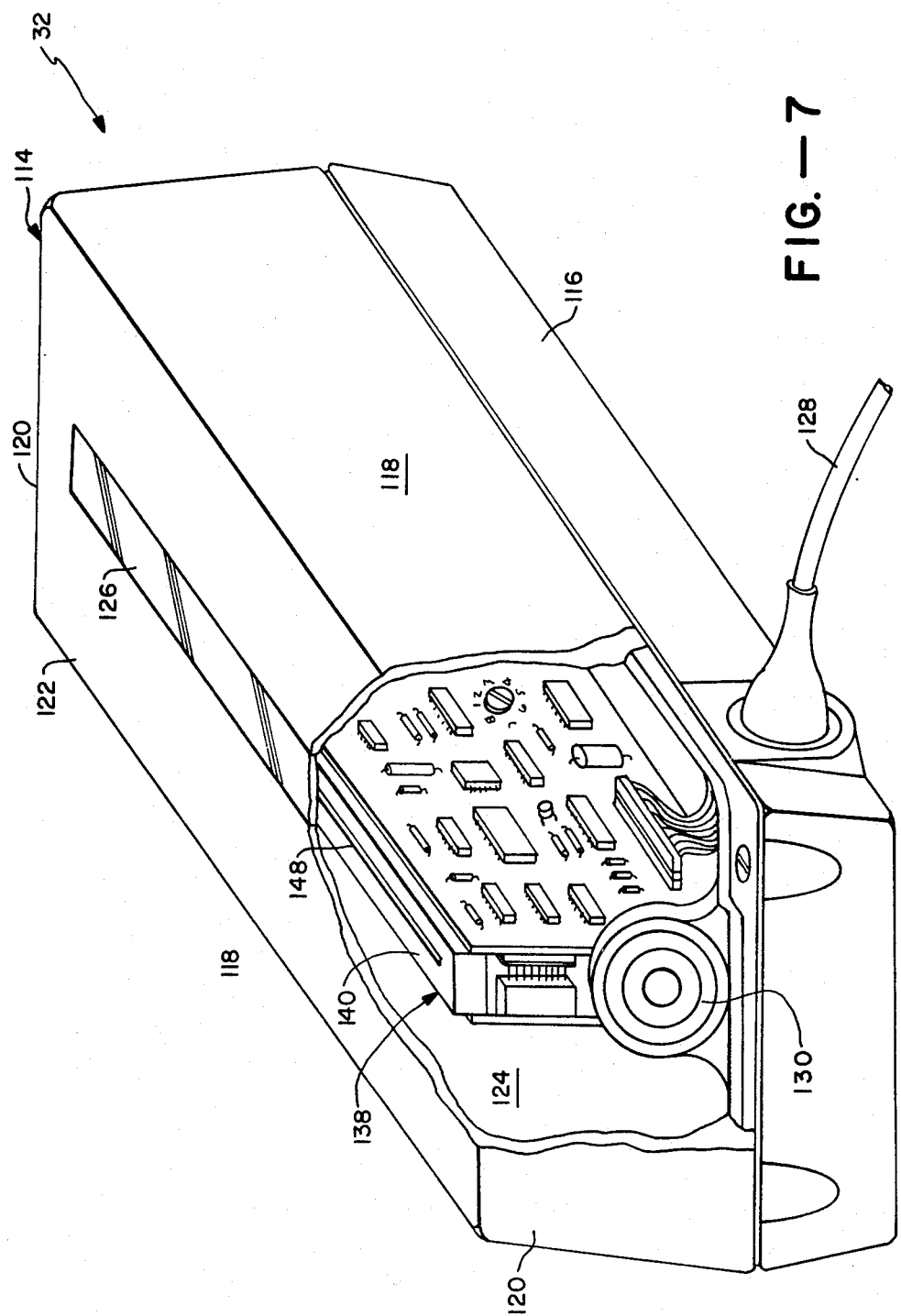
FIG.—7

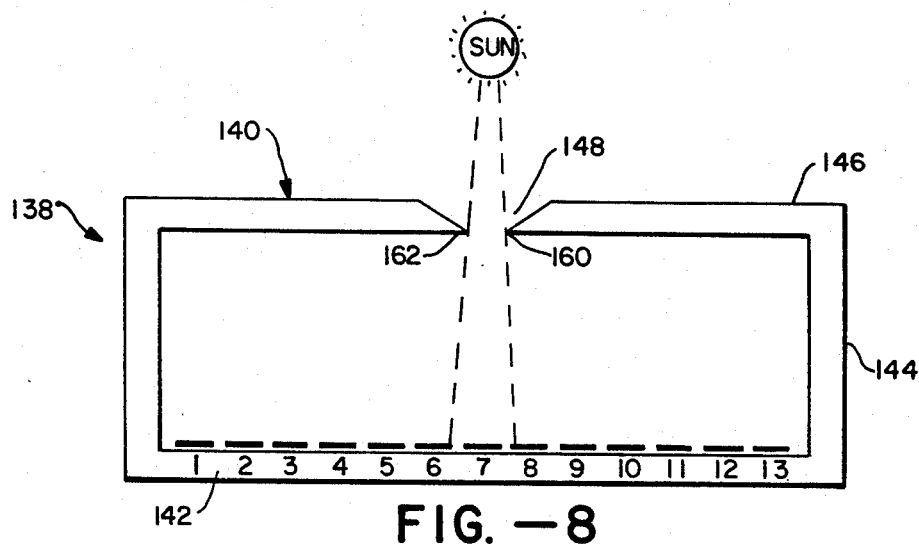
FIG. —8
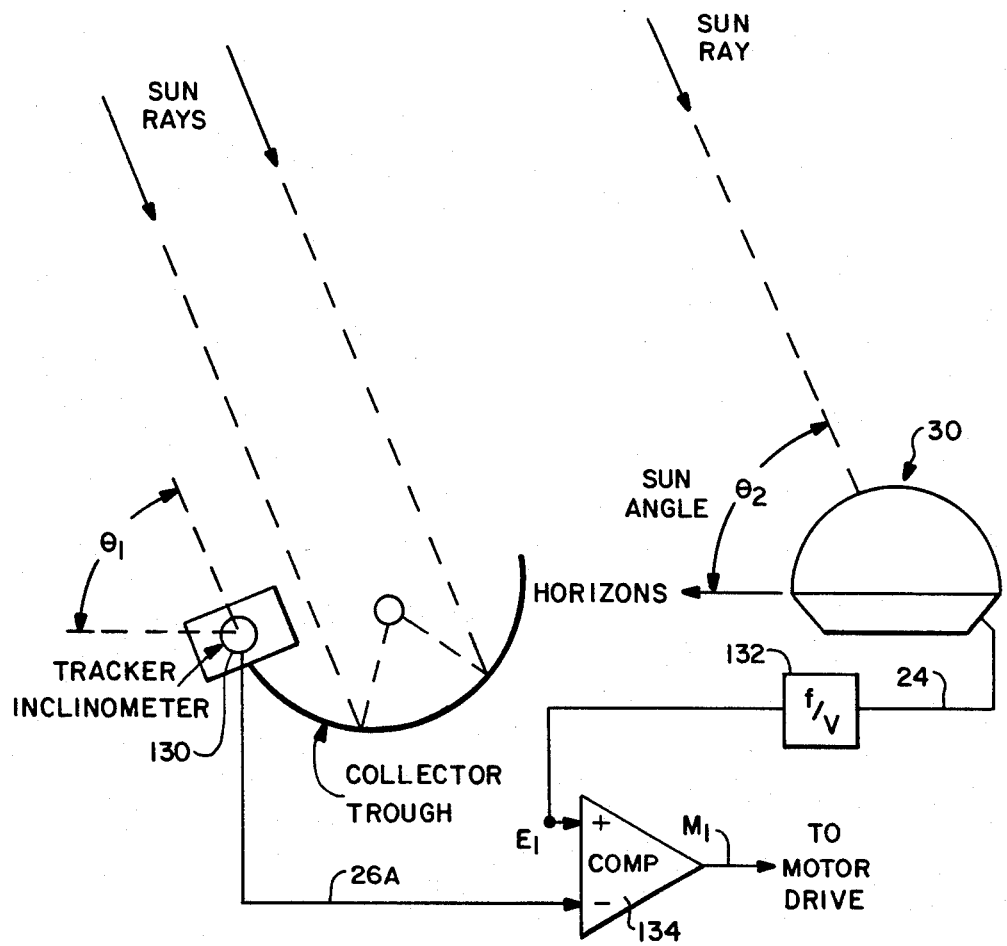
FIG. —9

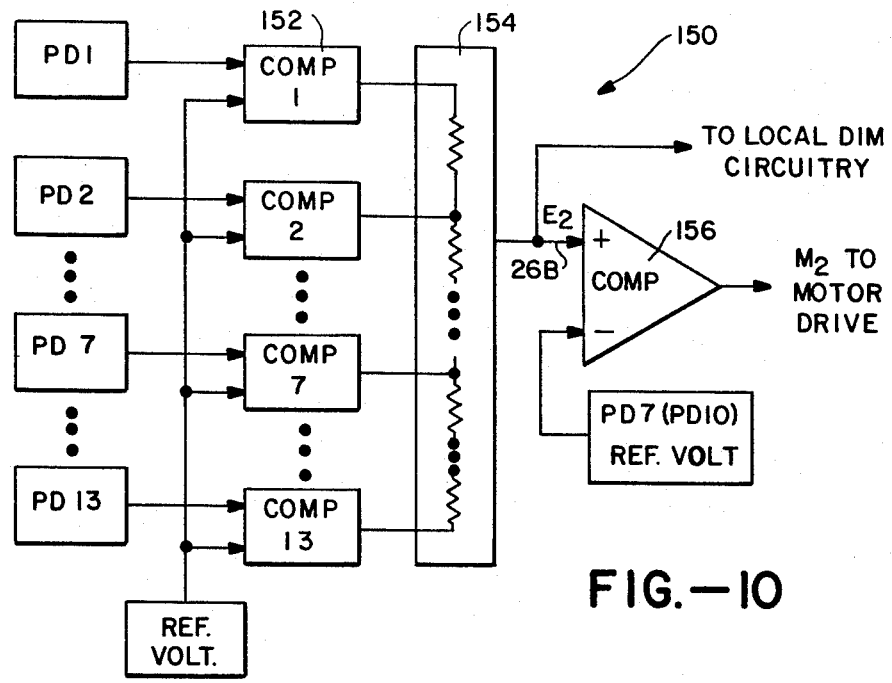
FIG.—10
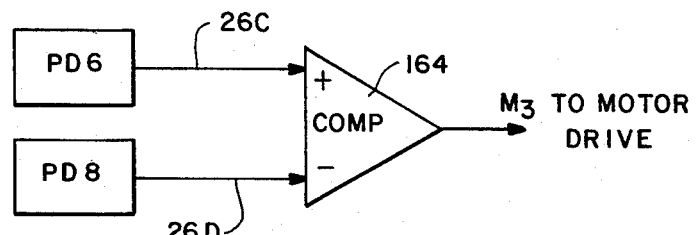
FIG.—11
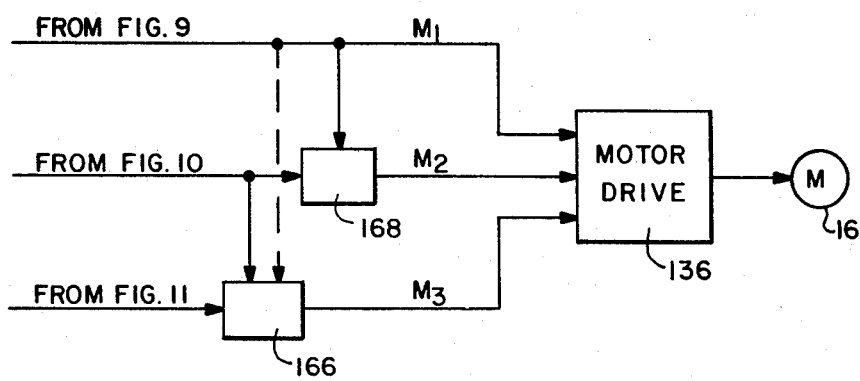
FIG.—12

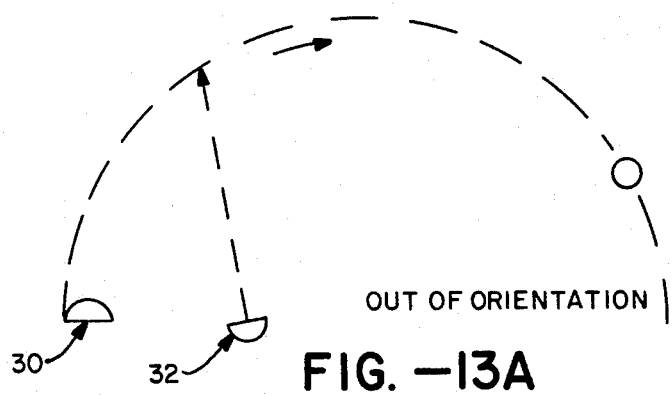
FIG.—13A  OUT OF ORIENTATION
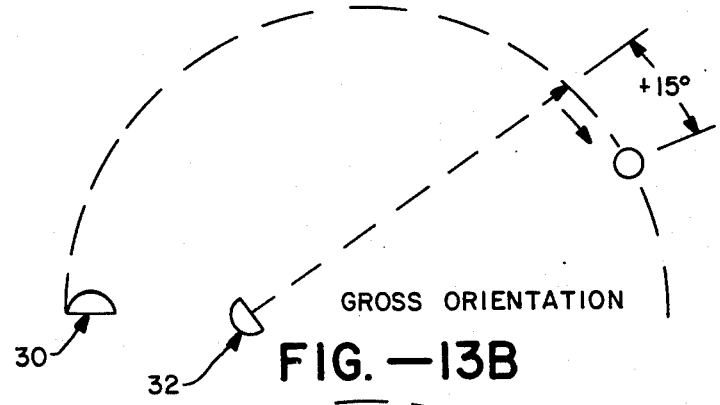
FIG.—13B  GROSS ORIENTATION  ±15°
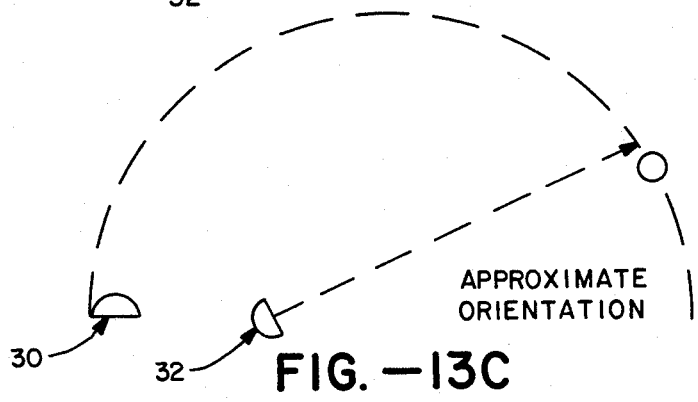
FIG.—13C  APPROXIMATE ORIENTATION
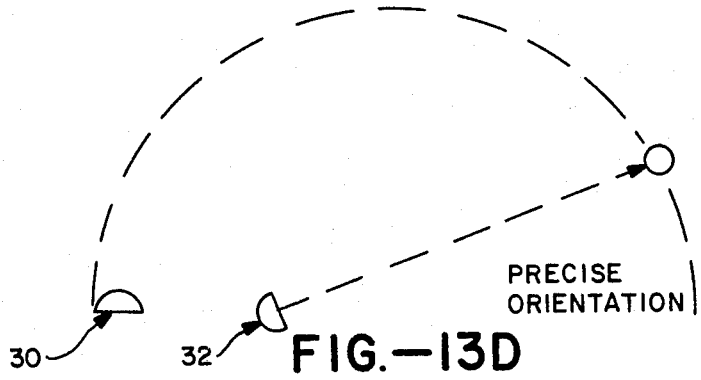
FIG.—13D  PRECISE ORIENTATION

TRACKING ARRANGEMENT FOR A SOLAR ENERGY COLLECTING SYSTEM

The present invention relates generally to solar energy collecting systems and more particularly to a system of the solar tracking type which includes a number of tracking panels, a specific arrangement of components for controlling movement of the panels in a prioritized fashion and specifically designed devices comprising part of the overall arrangement for detecting whether or not direct sunlight is present and if it is for maintaining each panel at a precise, controlled orientation with the sun.

Applicant's U.S. Pat. No. 4,297,572 (hereinafter referred to as the Carlton patent) is directed to a tracking type of solar energy collector assembly which includes a solar energy collecting panel mounted for movement along a tracking path in order to maintain a predetermined orientation with the sun as the latter moves across the sky from an initial position immediately following sunrise to a final position immediately preceding sunset. A solar tracking device is mounted for movement with the panel and is utilized to determine whether or not the latter is at the desired orientation. If it is not and if direct sunlight is present, an associated motor is driven in a way which places the panel at the proper orientation. A second, stationary device, specifically a direct insolation monitor (DIM) serves to detect the presence or absence of direct sunlight in order to prevent the solar tracking device from mistaking a relatively bright cloud or other diffused light for the sun.

In the patented assembly, the solar tracking device disclosed is one which uses a pair of identical photo detectors formed on a common silicon wafer spaced a predetermined distance from one another and a housing having an inner chamber containing the wafer and photodiodes in a fixed position therein. The housing also includes shadow means extending over and above the photodiodes and an opening into the housing chamber so as to expose the photo detectors to the ambient surroundings such that the latter are uniformly shaded from the sun by the shadow means (and thereby receive the same sunlight intensity) only when the panel itself is at the desired orientation with the sun. In this way, the panel can be moved into or maintained at a position which uniformly shades the two photo detectors, e.g. at the desired orientation with the sun.

The direct insolation monitor is one which includes a plurality of housings, each of which contains a group of spaced apart photo detectors formed on a common silicon wafer and a slotted opening sized to allow a limited beam of light therein for impingement on at least one contained photo detector. These housings are positioned relative to one another and to the ambient surroundings so that a limited beam of direct sunlight, assuming direct sunlight is present, will impinge on at least one photo detector in at least one of the housings regardless of the position of the sun as the latter moves across the sky. Thus, if direct sunlight is present, at least one photo detector will produce a corresponding, relatively high electrical signal indicative of its presence. If direct sunlight is not present, no such signal will be produced.

While both the solar tracking device and direct insolation monitor described in the Carlton patent are satisfactory for their intended purposes and while the overall assembly utilizing these devices is satisfactory for its ultimate intended purpose, one general object of the present invention is to improve upon these devices individually and in combination with one another as they function in the overall system.

Another general object of the present invention is to provide a tracking type of solar energy collecting system including other improved features over and above the patented assembly.

A more specific object of the present invention is to provide a relatively uncomplicated but reliable system of panels each including its own specifically designed solar tracker and a single specifically designed direct insolation monitor cooperating with all of the tracking devices so as to maintain each panel at the desired orientation with the sun so long as direct sunlight is present.

Another specific object of the present invention is to place each of the solar panels in the system at the desired orientation with the sun in controlled steps such that each panel is first placed in "gross" orientation with the sun, thereafter in "approximate" orientation and finally in "precise" orientation, whereby the panels do not have to be placed in a searching mode as described in the Carlton patent in order to find the sun once out of alignment.

Still another specific object of the present invention is to provide a direct insolation monitor type of device (hereinafter referred to as "STAR") which not only detects whether or not direct sunlight is present but also determines the position of the sun if direct sunlight is present and individual solar tracking type of devices, each of which not only determines whether or not its associated panel is at the proper orientation but also detects the actual position of its panel if direct sunlight is present (within its range) and, if so, the position of the sun, whereby to more readily place all of the panels in the desired orientation with the sun without resorting to the searching mode described in the Carlton patent.

Yet another specific object of the present invention is to operatively connect the solar position sensing feature of the STAR device to each individual panel (actually its local control means) in a reliable way, particularly by means of frequency characterized analog signals rather than amplitude characterized signals which are more susceptible to interference during transmission, preferably utilizing a twisted pair of cables.

A further specific object of the present invention is to provide an overall tracking type of solar energy collecting system which utilizes individual control centers at the various panels in the system and a single master control arrangement but which connects the master control arrangement with the local control centers in a reliable fashion, particularly by means of TOUCH TONE type signals, preferably by means of a twisted pair of cables.

Still a further specific object of the present invention is to provide an overall tracking type of solar energy collecting system having a master control arrangement which prioritizes its input signals depending upon the input's present, in a predetermined fashion.

Yet a further specific object of the present invention is to provide an input signal priority scheme which will always maintain the various panels in the system out of direct alignment with the sun (e.g. in a desteering mode) under certain conditions.

As will be described in more detail hereinafter, the solar energy collecting system disclosed herein is one which utilizes at least one but preferably a number of solar energy collecting panels, each mounted for movement along a tracking path in order to maintain a predetermined, fixed orientation with the sun as the latter moves across the sky and motor means for moving each panel along its tracking path. In addition, each panel and associated motor means are provided with their own local control center in close proximity while a single master controller positioned relatively far from at least some of the panels is used to instruct the various motor control centers for operating motor means and therefore cause their respective associated panels to move in a controlled fashion.

In accordance with one aspect of the present invention, each of the local control centers is adapted to receive different frequency characterized inputs, preferably TOUCH TONE signals, e.g., dual tone multi-frequency signals, for operating their associated motor means and thereby moving or stopping movement of their associated panel members in response to and dependent upon the input signals received. At the same time, the master controller is designed to provide these particular frequency characterized signals, depending upon the presence or absence of different predetermined conditions intended to affect the operation of each motor means and its associated panel.

In accordance with another feature of the present invention, the master controller includes means for prioritizing the frequency characterized output signals it produces in accordance a particular predetermined scheme.

In accordance with still another feature of the present invention, the overall system includes a single device, e.g. the STAR device, mentioned previously, positioned at a given location relative to the various panels for detecting the presence or absence of direct sunlight at that location (as a DIM would do) and, if direct sunlight is present, the position of the sun along its path (not otherwise provided by the DIM itself). This devise produces its own output signal characteristic of the position of the sun if direct sunlight is present, preferably a frequency characterized signal, and an output signal indicating whether or not direct sunlight is present. At the same time, the system includes individual devices mounted for movement with the various panels, each of which senses the position of its panel at any point along its tracking path and producing an output signal corresponding thereto. Each of these latter output signals and the solar position indicating output signal from the first-mentioned STAR device are utilized in accordance with yet another feature of the present invention to automatically place each panel in a position which is close to but not at the precise (intended) orientation with the sun, that is gross orientation with the sun, assuming the panel is not already here.

In accordance with a further feature of the present invention, after each panel has been moved into gross orientation with the sun, additional means forming part of each of the second-mentioned individual devices senses whether direct sun light is present (e.g. as a DIM would) and, if so, the position of the sun at that time for producing its own output signal corresponding to the specific position of the sun. This latter output signal is utilized to place its associated panel in a position which more closely approximates the desired predetermined orientation, that is in approximate orientation with the sun. Thereafter, this latter device provides still another output signal which indicates whether or not the associated panel is in the precise orientation with the sun and, if not, the panel is then so placed.

The foregoing features of the present invention and other features thereof will be discussed in more detail hereinafter in conjunction with the drawings wherein:

FIG. 1 diagrammatically illustrates partially in perspective view and partially in block diagram a tracking type of solar energy collecting system designed in accordance with the present invention;

FIG. 2 is a block diagram diagrammatically illustrating in more detail the system shown in FIG. 1;

FIG. 2A diagrammatically illustrates a situation where direct sunlight is available to some panels but not others as a result of local clouds.

FIG. 3 is a partially broken away perspective view of a device (e.g. the STAR device) which forms part of the system illustrated in FIGS. 1 and 2 and which is designed in accordance with the present invention to indicate whether or not direct sunlight is present and, if so, the angular position of the sun relative to the device;

FIG. 4 diagrammatically illustrates one optical aspect of the operation of the device illustrated in FIG. 3;

FIG. 5 schematically illustrates how the device of FIG. 3 indicates the position of the sun, assuming direct sunlight is present, as well as a means for converting its electrical output from an amplitude characterized analog signal to one which is frequency characterized and means for utilizing this converting means for manually controlling the overall system;

FIG. 6 graphically illustrates the converted frequency characterized output at the converter illustrated in FIG. 5 as it relates to the position of the sun;

FIG. 7 is a partially broken away perspective view of an overall device which is mounted for movement with an associated solar panel comprising part of the system illustrated in FIG. 1 and which is designed in accordance with the present invention for indicating (1) the position of its associated panel, (2) whether or not there is direct sunlight within a certain limited sector of the sky relative to that panel, (3) the position of the sun within that sector, assuming direct sunlight is present, and (4) whether or not its associated panel is at the precise (intended) orientation with the sun;

FIG. 8 diagrammatically illustrates an optical aspect of the way in which the device illustrated in FIG. 7 operates;

FIG. 9 schematically illustrates the way in which the device of FIG. 3 cooperates with each device of FIG. 7 for placing each associated panel in gross orientation with the sun;

FIG. 10 schematically illustrates how each of the devices illustrated in FIG. 7 places its associated panel even closer to the desired orientation with the sun;

FIG. 11 schematically illustrates how each device shown in FIG. 7 places its associated panel in precise orientation with the sun;

FIG. 12 schematically illustrates how the operational aspects described in FIGS. 9–11 are combined in a three step fashion to place each of the panels forming part of the overall system illustrated in FIG. 1 into gross orientation with the sun, thereafter approximate orientation with the sun and finally precise orientation with the sun, assuming direct sunlight is available and, without requiring that each panel move through a searching mode;

FIGS. 13A–13D pictorially illustrate the three step process just recited.

Turning now to the drawings, wherein like components are designated by like reference numerals throughout the various figures, attention is first directed to FIG. 1. This figure illustrates a tracking type of solar energy collecting system which is generally designated by the reference numeral 10 and which is designed in accordance with a number of different features of the present invention. As will be described in more detail hereinafter, system 10 includes at least one but preferably a number of solar energy collecting panels 12 which may be of any suitable type intended to track the sun as the latter moves between sunrise and sunset. For example, panel 12 could be a photovoltaic type of panel or it could be similar to the panel described in the previously recited Carlton patent, that is, a reflecting panel or panels having identical parabolic cross-sections, each defining a parabolic axis and a focal line. System 10 is shown including this latter type of panel and hence includes a suitable absorber tube 14 coextensive with the panels focal line.

While not shown, the panel 12 illustrated in FIG. 1 is supported by suitable means, for example the means illustrated in the Carlton patent, for movement along a tracking path so as to maintain a predetermined, fixed orientation with the sun. For more details of this mounting arrangement, reference is made to the Carlton patent which is incorporated herein by reference. As seen there and in FIG. 1, a motor indicated generally by the reference numeral 16 (in FIG. 1) is provided for actually moving its associated panel along its tracking path. While only one panel 12 and associated equipment including motor 16 is shown in FIG. 1, overall system 10 will more than likely include a number of these panel assemblies, all of which have their respective focal lines and therefore their absorber tubes in parallel relationship with one another. For reasons to become apparent hereinafter, this parallel relationship is important to the overall operation of system 10. Should photovoltaic type panels be used, their respective axes of rotation would be provided in this parallel relationship.

Overall system 10 includes a local control center 18 for each panel 12 and associated motor 16. Each local control center is preferably physically located in close proximity to its associated motor and provides an output indicated by arrow 20 for energizing or de-energizing its motor in a controlled fashion for either moving its associated panel member in one direction or the other or stopping movement thereof. Each local control center controls its own motor in response to and in accordance with various input signals generally indicated by arrows 22, 24 and 26. As illustrated in FIG. 1, the input 22 to each local control center is derived from the output of a single master controller 28 which serves the entire system and which is located at a position which may be quite far from some of the local control centers and associated solar panels. As will be seen hereinafter, output 22 depends on the inputs (input 23 and other inputs) to the master controller as will be discussed hereinafter. Inputs 24 to each local control center comes from master controller 28 but is actually derived from a single device 30 which serves both as a direct insolation monitor (DIM) and an arrangement for detecting the position of the sun regardless of its position in the sky between sunrise and sunset (assuming direct sunlight is present), as will be discussed hereinafter. Because of this latter capability which is equivalent to providing a solar tracking angle reference, the overall device will be referred to by the acronym STAR which was mentioned previously. The final input to each local control center illustrated in FIG. 1 is output 26 (actually 26A-D shown in FIG. 2) derived from a device 32 which is mounted for movement with the associated panel. In other words, overall system 10 includes a device 32 for each panel and local control center. As will be described in more detail hereinafter, each device 32 includes means for indicating to its local control center (1) the position of its associated panel, (2) whether or not direct sunlight is present (within certain limits), (3) the angular position of the sun (again within certain limits), and (4) whether or not its associated panel is at the precise desired orientation with the sun (assuming first other criteria have been met).

Referring now to FIG. 2, attention is directed to a more detailed description of the overall operation of system 10. As seen there, master controller 28 includes suitable circuitry 34 for receiving various inputs, for example those indicated by the input arrows 23, 36, 38 and 40, and for converting those inputs which are analog in character to digital signals such that only digital signals appear at the output of circuitry 34. One such signal is indicated by arrow 42. This and all of the other output signals from circuitry 34 are applied to circuitry 44 which comprises part of the master controller and which provides a single digital output signal 46 corresponding to one of its inputs depending upon the inputs present and a predetermined priority scheme. In any event, output 46 is applied to a circuit 48 also forming the output of master controller 28 and serving to convert the digital input 46 to a corresponding dual tone multi-frequency (DTMF) signal, e.g., a TOUCH TONE type of signal, at its output. This signal is applied to each and every local control center as previously recited input 22, preferably by means of a twisted pair of wires (a frequency carrying wire and a ground wire).

In the specific embodiment illustrated in FIG. 2, one of the inputs to master controller 28 is from a temperature sensing device 52 which is preferably located in close proximity to the master controller for indicating the temperature in the immediate area. This information is conveyed to the master controller by means of input 36. Input 38 indicates either that primary power is available for operating overall system 10 or that emergency power has taken over through an appropriate transfer switch 54. Input 40 (actually inputs) correspond to all of the other inputs into the master controller including an on/off switch, a manual/auto switch, etc. as discussed in the Carlton patent. As will be seen hereinafter, input 23 is from STAR device 30 and indicates whether or not direct sunlight is present at the device. All of these inputs are converted to digital signals if not already in this form and thereafter prioritized so that only one is converted to a DTMF output signal. The particular priority scheme can be readily provided and may differ with different systems. For example, in the particular system illustrated, during automatic operation thereof, if the ambient temperature drops below a predetermined level, signal 36 will take priority for placing each panel in its stowed position. If this is not the case but the primary power goes out causing the system to switch to emergency power, the master controller will cause each local control center to place its associated panel in a stowed position and will then turn off. There are other features not shown such as desteering and the like which have been discussed in the Carlton patent and which can be readily incorporated into the present system. With regard to desteering, it will be recalled from the Carlton patent that the solar panel or panels normally operate in two modes, a normal mode during which time the panel is in direct orientation with the sun and in a desteering mode during which time the panel is always out of direct alignment with the sun by a fixed angular amount for example by 10°.

Referring more specifically to the priority scheme provided by circuitry 44, in one embodiment, the scheme includes the prioritized functions in order of preference shown in Table I below:

TABLE I

Tracker Command Interfaces With Priority Ordering

| Priority | Command From Master Controller to Each Local Control | Action Taken By Each Local Control With Regard to Its Panel |
|---|---|---|
| 1 | CW (Stow) | CW rotation |
| 2 | CCW | CCW rotation |
| 3 | Manual Hold | Hold in present position but defocused by ≧5° |
| 4 | Wash | Rotation to predetermined wash position but defocused by ≧5° |
| 5 | Manual Position | Rotation to selected position as determined by STAR override but defocused by ≧5° |
| 6 | Desteer | Track but desteered by 5° toward CW (Stow) limit |
| 7 | STAR Hold | Hold in present position |
| 8 | STAR Track | Rotation to focus using STAR signal then track focused |

In a preferred embodiment, circuitry 44 includes "negative logic". That is, each of the positive commands such as those listed above is carried out (according to priority) by removing power rather than applying it. In other words, positive power is maintained in the absence of an intended function. In this way, a loss of power of an individual circuit (function), for example an accidental severing of conductors, will cause that function to be carried out (again, according to priority). Also, the priority scheme preferably includes means for always maintaining each of the panels out of focus, unless a focusing mode (the normal solar collecting mode) is selected. Thus, if for example, a WASH mode is selected, and the sun inadvertently moves into focus with a given panel, the particular panel is automatically moved out of focus.

Having described the way in which master controller 28 functions in response to its inputs, attention is now directed to the way in which the STAR device 30 and each panel follower device 32 function together to maintain each panel in precise alignment with the sun, that is, either in direct alignment or in a desteering mode, as the sun moves across the sky and so long as there is direct sunlight present at both the STAR and at each given panel. As will be described in more detail hereinafter, STAR 30 provides output signals 23 which is applied as an input into the master controller for prioritizing and processing and output signal 24. As stated previously, STAR 30 detects whether or not direct sunlight is present at its location and if so the angular position of the sun. Signal 23 indicates whether or not direct sunlight is present and, if not, signal priority and processing circuitry 44 orders the various local control centers to discontinue their gross alignment movement until direct sunlight is present, assuming that the system is in automatic mode and no other signals take priority (as discussed in more detail in the Carlton patent). Local control centers already grossly aligned with the sun will be allowed to attain a precise orientation provided sufficient insolation is available locally. Signal 24 actually results from a signal 24A which is a voltage characterized analog signal at the output of STAR 30 corresponding to the position of the sun, assuming direct sunlight is present. This signal may be applied directly to each local control center but is preferably converted to signal 24 which is a frequency characterized signal by suitable conversion circuitry 60. Signal 24 is preferably applied to each local control center by means of a twisted pair 62. Signal 24 also indicates when insufficient insolation is present at STAR 30.

Assuming that there is direct sunlight as seen by STAR 30, each of the devices 32 (which is carried by and with an associated panel) provides an output signal 26A corresponding to the position of its associated panel. Each output signal 26A is applied as an input to an associated local control center where it cooperates with input 24 from STAR 30 for moving its associated panel towards a desired orientation with the sun. The circuitry responding to these signals (to be discussed hereinafter) causes the panel to stop at an orientation angle equal to the STAR signal 24 angle position. The panel will then be within 15° of the desired precise orientation. Thus, each pair of signals 24 and 26A operate to place their associated panel in what may be called "gross orientation" with the sun.

Thereafter, once each panel is in gross orientation with the sun, its device 32 determines whether or not direct sunlight is present and produces a corresponding output signal 26B which is applied to their associated local control center 18. If direct sunlight is not present at a particular device 32, its associated local control center will de-energize its motor 16 or maintain it in a de-energized state, unless STAR device 30 indicates that direct sunlight is present. Under such a condition, device 32 will maintain gross alignment as per the STAR signal 24 as previously described. This situation can exist as illustrated in FIG. 2A. As seen there, STAR device 30 is clearly exposed to the sun while a particular device 32 a relatively large distance from STAR 30 is under clouds. If STAR 30 is under clouds and device 32 is exposed to sufficient insolation, desired orientation may be maintained provided device 32 views sufficient insolation within its 30° field of view. In other words, desired orientation may be sustained with STAR 30 indicating low insolation if gross alignment was accomplished prior to STAR 30 shading. If both the STAR device 30 and a given device 32 see direct sunlight, then that device 32 detects the angular position of the sun so long as the latter is at least at the previously recited gross orientation with the sun and produces an output signal, signal 26B again but of a different value corresponding to the sun's position. This output signal is applied to the associated local control center for moving its panel to a position which more closely approximates the desired orientation, that is, in "approximate" orientation with the sun. Once this is done, each device 32 senses whether or not its associated panel is in a position which precisely corresponds to the desired orientation and produces corresponding output signals 26C and 26D. This latter signal is used to place its associated panel at the precise orientation, if it is not already there, in the same manner described in the Carlton patent.

Thus, device 30 and each of the devices 32 cooperate with one another for carrying out a step-by-step process of first placing the various panels in gross orientation with the sun, thereafter in approximate orientation with the sun and finally in precise orientation with the sun, assuming that direct sunlight is available. This is to be contrasted with the technique utilized in the Carlton patent which relies on its stationary DIM as the sole means for determining whether or not direct sunlight is present (and for no other purpose) and its solar tracking device for determining whether or not the panel is at the preselected orientation with the sun (and for no other purpose). In this latter technique, once the DIM determines that direct sunlight is present, the tracking device must search for the sun which is quite time consuming. The present approach does not require or utilize a searching mode. The STAR 30 and each device 32 cooperate to move the various panels from their given positions directly towards and to positions in precise orientation with the sun as described above. This is carried out quickly and, as will be seen hereinafter, in an uncomplicated fashion.

Turning now to FIGS. 3–6, attention is directed to the structural and operational details of STAR device 30. As stated previously, the function of this device is to indicate whether or not there is direct sunlight present regardless of the position of the sun in the sky and its position if direct sunlight is present. Like the DIM described in the Carlton patent, this device accomplishes both of these functions without moving relative to its ambient surroundings. As will be seen below, from a structural standpoint, discounting certain electrical circuitry and minor variations, device 30 may be identical to the DIM described in the Carlton patent.

Turning specifically to FIG. 3, device 30 is shown including an overall outside housing 70 including a base 72 containing some of the electrical circuitry of the device (to be described in part with respect to FIGS. 5 and 6). The housing also includes a pair of spaced apart side walls 74 and 76 extending on opposite sides of and up from base 72. The top of housing 70 includes a light opaque closure 78 (see FIG. 1) containing four equally spaced apart windows 79. As seen in FIG. 3 only, STAR 30 contains within housing 70 a circuit board 84 comprised of a substrate and a number of electronic components which in part operate in the manner to be discussed hereinafter with respect to FIGS. 5 and 6 and in part as described in the Carlton recited (which will be discussed generally hereinafter). The substrate itself is utilized to support four arrangements 86 which are equally spaced angularly from one another in confronting relationship with respective ones of said windows 79 for determining whether or not direct sunlight is present within their respective fields of view and, if direct sunlight is present, for detecting the sun's angular position relative to the STAR device.

Referring specifically to FIG. 4, attention is directed to one of the arrangements 86 which is shown somewhat diagrammatically. As seen there, the arrangement includes a light opaque housing 88 including side walls 90, a base 92 and a top 94, all of which define an interior chamber 98. The only entry into this chamber for sunlight is a slot 100 which extends transverse to the direction of light opaque cover 78, that is, normal to side walls 74 forming part of overall device housing 70. Located within chamber 98 are thirteen equally spaced photo detectors which in the particular arrangement illustrated are designated as photo detectors 1, 2 and so on up to photo detector 13. Another one of the arrangements includes photo detectors 14 to 26, still another one includes photo detectors 27 to 39 and the last arrangement includes photo detectors 40 to 52.

Each arrangement 86 as described thus far is preferably identical to the corresponding arrangements described in the Carlton patent, except that arrangements 86 include thirteen photo detectors each whereas a corresponding arrangement in the patent included eleven photo detectors. Nevertheless, the photo detectors in each arrangement 86, like those in the patent, are identical parts of a common silicon wafer formed on the inner surface of base 92 and interconnected electrically into the associated circuitry so as to operate in the manner to be described.

Overall device 30 is designed to operate in its intended manner when positioned such that its lengthwise dimension of cover 78 faces and is parallel with the path of the sun from sunrise to sunset, that is, parallel to the rotational movement of all of the panels 12. This means that the side panels 74 of the device housing are perpendicular to the axis of rotation of each panel 12, as best illustrated in FIG. 1.

With overall device 30 placed in this operating position, each of the arrangements 86 operates to allow a limited and relatively narrow beam of light into its chamber as diagrammatically illustrated in FIG. 4. Each specific housing is positioned to monitor one-quarter of the total zone of the sky being monitored and the positional relationship between slit 100 and its associated thirteen photo detectors in each specific arrangement is such that a narrow beam of direct sunlight will always impinge on at least one of these photo detectors as the sun moves through the quadrant of the sky being monitored. In other words, like applicant's DIM described in the Carlton patent, with all four arrangements 86 positioned to divide the sky into four quadrants, if there is any direct sun at all in the sky, a narrow beam of sunlight will impinge upon at least one of the photo detectors in one of the housings. This, in turn, means that at least one of the photo detectors, e.g., the one receiving the direct beam of sunlight, will provide a greater transduced electrical output (for example a higher voltage) than the other photo detectors, e.g., the ones that do not receive a beam of direct sunlight. Moreover, because only a limited beam of sunlight is allowed into each housing, the possibility of impinging on one or more of the photo detectors with accumulated diffused light of equal intensity as direct sunlight is quite remote.

As stated above, device 30 functions to detect whether or not there is direct sunlight present and if so the position of the sun. The device detects whether or not direct sunlight is present, that is, as a direct insolation monitor in the same manner as the corresponding device in the Carlton patent. Since the circuitry involved to accomplish this is substantially identical (except for the number of photo detectors used) and since this is described in detail in the Carlton patent, this particular mode of operation will not be discussed in detail herein. It suffices to say that the overall device 30 produces a digital output DIM signal (previously recited signal 23) for indicating whether or not direct sunlight is present. For example, if a beam of sunlight sufficiently intense to indicate the presence of direct sunlight impinges on one of the fifty-two photo detectors, it produces a corresponding voltage signal which is compared to an adjusted reference signal for producing a positive signal. If no direct sunlight is present, no such positive signal is produced.

Device 30 utilizes the same optical arrangement for providing an output signal corresponding to the position of the sun as it does to produce its DIM signal. In other words, the device relies on its photo detectors to provide output signals corresponding to the amount of light they sense. The outputs from all fifty-two photo detectors are applied to corresponding inputs of corresponding comparators forming part of the circuitry 102 illustrated in FIG. 5. Since there are fifty-two photo detectors, circuitry 102 includes fifty-two comparators. Each comparator includes a second input for receiving an adjustable reference voltage which may be provided in the manner described in the Carlton previous patent or in any other suitable way. In any event, the reference voltage is selected to be equal in intensity to the output of a photodiode which senses direct sunlight. All fifty-two comparators have their outputs connected successively into a resistance ladder 104 having a single output 106.

Overall circuitry 102 as described thus far provides a voltage characterized analog signal at the output 106 of resistance ladder 104 which depends on whether or not direct sunlight is present and if it is which of the fifty-two photo detectors sense it. More specifically, if direct sunlight is not present, the output at each and every photodetector will be less than the reference voltage and hence there will be a voltage present at output 106 greater than the maximum expected as defined directly below. If there is sunlight present and if the sun is positioned so that, for example, photo detector 2 senses it, circuitry associated with comparator 2 will ground the resistance ladder at a corresponding point. Thus the voltage at the ladder's output will correspond to this point and therefore correspond to photo detector 2 which, in turn, corresponds to the position of the sun. In this way, the amount of voltage at output 106 will depend on the position of the sun, from a minimum voltage where PD1 senses direct sunlight to a maximum voltage when PD52 senses direct sunlight. Circutry 102 could be made to provide a voltage greater than the maximum at output 106 when no direct sunlight is present, thereby indicating the absence of direct sunlight. In this way, if the output 106 is between the minimum and maximum, this would also indicate the presence of direct sunlight.

From the foregoing, it should be apparent that device 30 monitors a sector of the sky which depends on photo detectors PD1-PD52. In the embodiment illustrated, if all fifty-two photo detectors are operative, the entire extent of the sky is monitored from sunrise to sunset. On the other hand, device 30 can be provided with "electronic blinders". More specifically, by making for example PD1-PD12 and PD41-PD52 inoperative (so that they are always below the reference voltage), the overall device will only be operative when the sun impinges on photo detectors PD13-PD40. Thus, operation of the overall device 30 is limited to a smaller sector of the sky. The photo detectors PD1-PD12 and PD41-PD52 (or any other group depending on the sector of the sky to be monitored) can be made inoperative in any suitable way, for example by grounding the photo detector input of their associated comparator.

While the solar position indicating signal at output 106 could be utilized in its voltage characterized form (signal 24A) as an input to each local control center 18 (see FIGS. 1 and 2) it is most reliably applied to the various local control centers in a frequency characterized format (signal 24). Thus, circuitry 102 includes a suitable and readily provided voltage-to-frequency converter 108 ultimately responsible for producing the previously described output signal 24B which is preferably physically carried to the various local control centers by means of twisted pair 62, as discussed previously. This ultimately produced output signal is graphically illustrated in FIG. 6 in relation to the actual angular position of the sun from sunrise to sunset. As the sun moves across the sky in this way, the voltage signal at output 106 increases which causes the frequency signal at the output of converter 108 to increase. If the signal goes above the maximum value shown, this indicates that no direct sunlight is available at that time. This information can be used instead of DIM output 23 and, hence, would be provided as an input to the master controller.

Overall circuitry 102 not only operates in the manner described above, that is, to provide a frequency characterized signal corresponding to the position of the sun assuming direct sunlight is present, but also as a means to rapidly and reliably manually override the system when the latter is in its automatic mode. This is accomplished by providing a switch 110 movable between a first position connecting output 106 to the input of converter 108 and a second position connecting the input of the converter to a variable voltage source 112 which manually provides a voltage characterized signal simulating the output 106. With switch 110 in its second position, the converter responds to this simulated signal for producing a corresponding frequency characterized output signal on its twisted pair for application to each and every local control center. Thus, an individual can use this manual means to locate each and every panel in any desired position, as will become apparent hereinafter.

Having described overall STAR device 30 both structurally and functionally including specifically circuitry 102, attention is now directed to the details of an exemplary one of the devices 32 which is shown in FIG. 7. The device shown there which may be used for single axis tracking or multi-axis tracking includes an overall housing 114 and suitable means (not shown) for mounting the housing for movement with an associated solar panel 12. Housing 114 includes a base 116, opposite side walls 118, opposite end walls 120 and a top side 122, all of which are light opaque and together define an interior chamber 124. An elongated transparent window 126 is centrally located in top side 122 and extends in a direction parallel with side walls 118. Suitable electrical inputs into and out of housing 114 are provided by suitable means such as cable 128. As described briefly above, each device 32 operates in a number of different modes, alone and in conjunction with STAR device 30, for ultimately placing its associated panel in the precise desired orientation with the sun, assuming direct sunlight is present at the particular device 32.

In its first operating mode, each device 32 operates in conjunction with STAR 30 to place its associated panel into gross orientation with the sun, assuming it is not already in this position and that direct sunlight is present. In order to accomplish this, each device 32 includes an inclinometer 130 mounted in chamber 124 and oriented (and calibrated) to provide an electrical output signal corresponding to the angular position of its associated panel. This is best illustrated in FIG. 9 which shows the simultaneous rotation of the inclinometer and its associated panel through an angle $\theta_1$ and the angular movement of the sun through the angle $\theta_2$ relative to STAR device 30. The frequency characterized output signal 24 from the STAR device is converted back to a corresponding voltage characterized signal E1 at each local control center utilizing suitable frequency-to-voltage conversion means generally indicated at 132. The voltage characterized signal E1 is applied to one input of a comparator 134 which is also located at the associated local control center. The second input to the comparator is connected with the electrical output of its associated inclinometer 130, which is actually the previously described signal 26A.

Assuming that it is desired to place the panel illustrated in direct alignment with the sun and assuming that direct sunlight is present as detected by the DIM function of STAR 30, the comparator will receive one input (E1) corresponding to the angular position of the sun with respect to device 30 and a second input (26A) corresponding to the position of the panel 12 illustrated. If angle $\theta_1$ is approximately equal to angle $\theta_2$, that is, within 15°, for example, the two input signals to comparator 134 will be equal and its output will be zero. On the other hand, if angles $\theta_1$ and $\theta_2$ are substantially different because the panel is substantially out of alignment with the sun, the signals will be different and the comparator will carry an output signal. This signal designated as $M_1$ is applied to a motor drive mechanism 136 at the motor control center (see FIG. 12) which responds thereto for energizing associated motor 16. In this way, the associated panel 12 is caused to move from a grossly out of solar alignment position as for example illustrated in FIG. 13A to a position in gross alignment with the sun, that is, within about 15° of precise alignment, as illustrated in FIG. 13B. At this time, the output to comparator 134 goes to zero, thereby de-energizing motor 16 through motor drive mechanism 136. Thereafter, as will be seen below, a second feature of each device 32 automatically takes over controlling its associated motor drive mechanism 136 for operating corresponding motor 16.

Returning to FIG. 7, the overall device 32 shown there not only includes an inclinometer 130 within chamber 124 but also an arrangement 138 which, as will be described below, corresponds in functions to one of the arrangements 86 shown in FIG. 4 forming part of STAR 30 illustrated in FIG. 3. Arrangement 138 is best illustrated diagrammatically in FIG. 8. As seen there, this arrangement includes an overall housing 140 having a base 142, upstanding side walls 144 and a top side 146 defining an interior chamber 147 and a relatively narrow opening 148 located directly below previously recited window 126, as best seen in FIG. 7. Like previously described arrangements 86, arrangement 138 includes thirteen photo detectors PD1, PD2 and so on within its housing and preferably on a single wafer. These photo detectors are positioned so as to extend transverse to opening 148 and receive sunlight in the same manner as the photo detectors associated with each of the arrangements 86. However, since overall device 32 includes only one arrangement 138, it will respond to direct sunlight within a limited angular range (e.g. $\approx \pm 15°$), that is, when the device and its panel 12 are placed in gross alignment with the sun. So long as that is the case and assuming direct sunlight is present, at least one of the photo detectors PD1-PD13 will receive direct sunlight which is used to detect the position of the sun relative to overall device 32 for placing its associated panel into closer alignment with the sun, as will be described below in conjunction with FIGS. 10, 12 and 13.

Referring to FIG. 10, each of the photodiodes 1–13 of the overall arrangement 138 illustrated in FIG. 8 is shown as part of an overall circuit 150 which along with other circuitry may be contained within housing 114 as illustrated in FIG. 7. Circuitry 150 includes thirteen comparators 152, each of which corresponds in function to the previously described comparators 101 forming part of circuit 102 (see FIG. 5) and a resistance ladder 154 which corresponds in function to previously described resistance ladder 104, although the ladder 154 only includes thirteen steps as opposed to fifty-two. The output E2 of resistance ladder 154 which is actually previously recited signal 26B is applied to one input of a comparator 156. The other input to the comparator is connected to a fixed reference voltage which depends upon the desired orientation of the associated solar panel with the sun. If it is desired to have the panel in direct alignment with the sun, then the reference voltage equals the output voltage of the resistance ladder when direct sunlight impinges the center photo detector, specifically photo detector PD7. On the other hand, if it is desirable to operate the panel in a desteer mode, then the reference voltage would be selected to correspond to the voltage of the resistance ladder when direct sunlight impinges a non-central photo detector, for example photo detector PD10. Circuit 150 operates in the following manner. First, assuming that the associated panel is not even in gross alignment with the sun (within ±15° of direct alignment), then none of the photodiodes PD1-PD13 forming part of arrangement 138 will receive direct sunlight. As a result, the signal E2 at the output of resistance ladder 184 will be a maximum value. This will also be the case if the panel is in gross alignment with the sun but no direct sunlight is present. On the other hand, once the panel is moved into gross alignment with the sun in the manner described previously, one of the photo detectors forming part of arrangement 138 will sense direct sunlight and produce between a minimum and maximum output voltage at E2, depending upon which photodiode receives direct sunlight and therefore depending upon the position of the sun. This output signal is applied to comparator 156 and compared to the reference voltage. So long as the two are not equal, comparator 156 produces an output signal $M_2$ which, as best illustrated in FIG. 12, is applied to the input of previously described motor drive mechanism 136 for energizing and driving motor 16. This in turn, moves associated panel 12 until the output of comparator 156 goes to zero which occurs when the voltage at E2 is equal to the reference voltage, that is, when the panel is in approximate (closer than gross) alignment with the sun. At that time, another feature of overall device 32 takes over to place the panel in precise alignment with the sun, as will be discussed below. If the panel is in gross alignment with the sun but the associated device 32 does not see direct sunlight, E2(26B) will be above the maximum value and is used to operate local DIM circutry (within the device 32) for preventing the motor from being energized except to maintain gross alignment with the STAR signal as described previously.

Returning to FIGS. 7 and 8, arrangement 138 is shown including two shadow shoulders 160 and 162 which confront one another on opposite sides of slitted opening 148 so as to partially shadow photodiodes 6 and 8 when the arrangement is in direct alignment with the sun or two other photodiodes, for example, photodiodes 9 and 11 when the overall system is in a desteered mode.

In this way, the overall arrangement may function in the same way as corresponding device 28' illustrated in FIG. 10 of the Carlton patent. Specifically, assuming that the overall system is operating to place a given panel in direct alignment with the sun, the outputs from photodiodes 6 and 8 (previously recited outputs 26C and 26D) are applied to the two inputs of a comparator 164 illustrated in FIG. 11. Assuming that the associated panel has been placed in approximate alignment with the sun as described previously, but not in precise alignment, one of these two photo detectors PD6 and PD8 will continue to receive more sunlight than the other. This will result in a positive or negative signal at the output $M_3$ of the comparator which is applied to motor drive mechanism 136 for operating motor 16 through suitable switching circuitry 166. The switching circuitry is designed to apply the output of comparator 164 to the motor drive mechanism only after the associated panel has been placed in approximate alignment with the sun, that is, when the output of comparator 156 has gone to zero. Thus, the output from comparator 156 (FIG. 10) is not only applied to motor drive mechanism 136 but to switching circuitry 166 for maintaining the switching circuit open so long as this output is not at zero. It may be necessary to provide a second input to the switching circuitry from the output of comparator 134 (FIG. 9) for the same purposes so as to insure that comparator 164 does not operate the motor drive mechanism while the panel is being placed in gross alignment with the sun. The output from comparator 134 could also be applied to a switch 168, in line $M_2$ to prevent circuit 150 from operating the motor until its panel is placed in gross alignment with the sun (e.g. when the output to comparator 134 goes to zero). In any event, once the system goes into its precise positioning mode, comparator 164 is utilized to operate the associated motor and cause its corresonding panel to move in precise alignment with the sun. This is accomplished when the two photodiodes PD6 and PD8 are equally shadowed, at which time the output of comparator 164 goes to zero. As the sun continues to move across the sky, assuming direct sunlight is always present at each of the panels, each device 32 will operate in its precise positioning mode for maintaining direct alignment with the sun. Should the sun go behind the clouds as it moves, it is quite possible that the disparity between the sun and each panel will be sufficiently great to cause the system to go into its approximate positioning or gross positioning mode with an appropriate hysteresis to minimize movement during local cloud passage.

What is claimed is:

1. A tracking type of solar energy collecting system, comprising:
    (a) means including a panel member for collecting solar energy, said panel member being mounted for movement along a tracking path in order to maintain a predetermined, fixed orientation with the sun as the latter moves across the sky from an initial position following sunrise to a final position immediately preceding sunset;
    (b) actuator means for moving said panel member along said tracking path;
    (c) local control means in close proximity to said panel member and actuator means and adapted to receive alternatively different frequency characterized inputs for operating said actuator means and thereby moving or stopping movement of said panel member in response to and dependent on the particular input received;
    (d) remote control means positioned substantially further from said panel member and actuator means than said local control means for producing a single output signal having a frequency which is responsive to and depends upon any one of a number of different signals received at its input, said last-mentioned signals respectively corresponding to the presence or absence of a number of different conditions intended to affect the operation of said actuator means and therefore the movement of said panel member; and
    (e) means for applying the frequency characterized output signal from said remote control means to the input of said local control means so as to serve as a frequency characterized input thereto.

2. A system according to claim 1 wherein at least some of the signals received at the input of said remote control means have voltages characteristic of the conditions they represent, said remote control means including means for converting each of said voltage characterized input signals to a corresponding digital signal and means for converting said digital signal to a frequency characterized output signal.

3. A system according to claim 1 wherein said remote control means includes means for prioritizing its input signals in the event that more than one are received at one time so as to produce an output signal corresponding to a predetermined one of the simultaneously received input signals depending upon the input signals received.

4. A system according to claim 1 including: means positioned at a given location relative to said local and remote control means for detecting the presence or absence of direct sunlight at said location and, if direct sunlight is present, the position of the sun along its path, said detecting means producing its own output signal characteristic of the position of the sun if direct sunlight is present; and means for applying said last-mentioned output signal directly to the input of said local control means separate from said frequency characterized inputs.

5. A system according to claim 4 wherein the output signal produced by said detecting means has a frequency characteristic of the position of the sun.

6. A system according to claim 5 wherein the output signal from said remote control means and the output signal from said detecting means are respectively applied to corresponding inputs of said local control means by means of two twisted pairs of electrical wires.

7. A system according to claim 5 wherein said detecting means produces an intermediate signal having a voltage characteristic of the position of the sun if direct sunlight is present, said detecting means including means for converting said last-mentioned voltage characterized signal to its frequency characterized output signal.

8. A system according to claim 7 including means separate from said detecting means for producing a manually controlled variable voltage signal and means for applying said variable voltage signal to the input of said voltage to frequency converting means rather than the output from said detecting means whereby to manually simulate the output of said detecting means.

9. A system according to claim 3 wherein said control means includes negative logic for producing its output signal in response to its input signal.

10. A tracking type of solar energy collecting system, comprising:
   (a) means including a panel member for collecting solar energy, said panel member being mounted for movement along a tracking path in order to maintain a predetermined, fixed orientation with the sun as the latter moves across the sky from an initial position following sunrise to a final position immediately preceding sunset;
   (b) actuator means for moving said panel member along said tracking path;
   (c) means positioned at a given location relative to said actuator means for detecting the presence or absence of direct sunlight at said location and, if direct sunlight is present, the position of the sun along its path, said detecting means producing its own output signal characteristic of the position of the sun if direct sunlight is present and a different output signal indicating if direct sunlight is not present;
   (d) means mounted for movement with said panel member for sensing the position of said panel member at any point along its tracking path and producing an output signal corresponding thereto; and
   (e) actuator control means responsive to and dependent on all of said output signals for operating said actuator means so as to place said panel member at said predetermined orientation with the sun or at least in gross orientation, if direct sunlight is present.

11. A system according to claim 10 wherein the output signal from said detecting means characteristic of the sun's position is a frequency characterized signal and wherein the output signal from said detecting means characteristic of the absence of direct sunlight is a separate signal which can be produced simultaneously with the frequency characterized signal.

12. A system according to claim 10 wherein both of the output signals from said detecting means are frequency characterized signals.

13. A system according to claim 10 including means mounted for movement with said panel member and responsive to the position of the sun along its path for producing output signals indicating whether or not said panel member is approximately or precisely at said predetermined orientation with the sun, said actuator control means being responsive to said last-mentioned output signals for first placing said panel member in approximate orientation with the sun and then in precise orientation with the sun in the event this is not accomplished by the actuator control means in response to the first-mentioned output signals.

14. A system according to claim 13 including a single housing for containing both of said means mounted for movement with said panel member.

15. A system according to claim 14 wherein said means for sensing the position of said panel member includes an inclinometer.

16. A tracking type of solar energy collecting system, comprising:
   (a) means including a plurality of spaced apart panel members for collecting solar energy, each of said panel members being mounted for movement along a tracking path in order to maintain a predetermined orientation with the sun as the latter moves across the sky from an initial position following sunrise to a final position immediately preceding sunset;
   (b) a plurality of actuator means, equal in number to said plurality of panel members, each actuator means being positioned adjacent an associated panel member for moving the latter along its tracking path;
   (c) single means positioned at a fixed location closer to some of said panel members than others for detecting the presence or absence of direct sunlight at said location and, if direct sunlight is present, the position of the sun along its path, said detecting means producing its own output signal characteristic of the position of the sun if direct sunlight is present and a different output signal if direct sunlight is not present;
   (d) an assembly mounted for movement with each of said panel members, each of said assemblies including
      (i) panel tracking means for sensing the position of its associated panel member at any given point along its tracking path and producing an output signal corresponding thereto, and
      (ii) solar tracking means responsive to the position of the sun along its path for producing output signals indicating whether or not direct sunlight is present at its associated panel member and whether or not its associated panel member is in approximate or gross orientation with the sun; and
   (e) a plurality of actuator control means equal, in number to said plurality of panel members, respectively positioned in close proximity to respective ones of said panel members, each of said actuator control means being responsive to and dependent on the output signals from said detecting means and said panel tracking means for operating said actuator means so as to place said panel member in gross orientation with the sun, if direct sunlight is present and so as to maintain the panel member stationary during the absence of said direct sunlight, said actuator control means also being responsive to and dependent on the output signals from said solar tracking means for first placing its panel member in approximate and then precise orientation with the sun after the latter has been placed in gross orientation with the sun if direct sunlight is present, whereby even those panel members located a relatively large distance from said detecting means will be in precise orientation with the sun.

17. A tracking type of solar energy collecting system, comprising:
   (a) means including a panel member for collecting solar energy, said panel member being mounted for movement along a tracking path in order to maintain a fixed orientation with the sun as the latter moves across the sky from an initial position following sunrise to a final position immediately preceding sunset;
   (b) means including an actuator for moving said panel member along its tracking path or for maintaining said panel member in a stationary position in a controlled manner dependent upon and responsive to predetermined input signals;
   (c) stationary means positioned at a given location relative to said actuator including means and said panel member for detecting the presence or absence of direct sunlight at said location and, if direct sunlight is present, the position of the sun along its path, said detecting means producing a first output signal characteristic of the position of the sun, if direct sunlight is present;

(d) panel tracking means mounted for movement with said panel member for sensing the position of said panel member at any point along its tracking path and producing a second output signal corresponding thereto;

(e) means for comparing the output signals from said detecting means and panel tracking means and, in response thereto, for producing its own third output signal if said panel member is out of said fixed orientation with the sun by at least a predetermined gross amount, said third output signal being applied to the input of said actuator including means as one of said predetermined inputs for causing said actuator to move said panel member to a position which grossly approximates said fixed orientation; and (f) solar tracking means mounted for movement with said panel member for sensing whether or not said panel member is precisely or almost precisely at said predetermined orientation and producing a fourth output signal if the panel member is not, said fourth output signal if present being applied to the input of said actuator including means only after said panel member is at a position which grossly approximates said predetermined orientation for causing said actuator to move said panel member from this latter position to a position which is precisely at or almost precisely at said fixed orientation.

18. A system according to claim 17 wherein said solar tracking means includes means for sensing the position of the sun relative to the position of the panel member when the latter is in a position which grossly approximates said predetermined orientation and for producing an intermediate signal which corresponds to the degree to which the panel member is out of orientation with the sun, and means for comparing said last-mentioned signal to a fixed reference signal for producing said fourth output signal if said panel member is not precisely or almost precisely at said predetermined orientation.

19. A system according to claim 18 wherein said solar tracking means includes means for sensing the exact orientation of said panel member with the sun and producing a fifth output signal if said panel member is in a position which is not precisely at said fixed orientation, said fifth signal, if present, being applied to the input of said actuator including means for placing said panel member at a position precisely at said fixed orientation but only after said panel member is at a position almost precisely at said fixed orientation.

20. A system according to claim 18 wherein the panel member is in direct alignment with the sun when the panel member is at said fixed orientation and wherein said solar tracking means includes means for providing said fixed reference signal, means for providing a different fixed reference signal and means for selectively but alternatively comparing said intermediate signal with said reference signals for producing or not producing the fourth output, said second fixed reference signal being selected so as to produce said fourth output signal when said panel member is not in a position precisely or almost precisely at a second fixed orientation with the sun different than the first-mentioned fixed orientation.

21. A tracking type of solar energy collecting system, comprising:

(a) means including a solar panel for collecting solar energy, said panel being mounted for movement along a tracking path in order to maintain a fixed orientation with the sun as the latter moves across the sky from an initial position following sunrise to a final position preceding sunset;

(b) panel moving means including an actuator for moving said panel in a controlled manner along its tracking path or for maintaining said panel member in a stationary position;

(c) panel tracking means mounted for movement with said panel for sensing the position of the panel on its tracking path;

(d) stationary means responsive to both the position of the sun and the position of said panel for operating said panel moving means so as to place said panel in a position which is within a certain gross proximity of said fixed orientation with the sun if not already in that position; and (e) solar tracking means mounted for movement with said panel and responsive to the position of the sun for operating panel moving means so as to place said panel at precisely or almost precisely said fixed orientation with the sun if not already in that position, but only after the panel has been placed in a position which is in gross proximity with said fixed orientation.

22. A system according to claim 21 wherein said solar tracking means includes means for operating said panel moving means so as to first place said panel almost precisely at said fixed orientation and thereafter precisely at said fixed orientation with the sun.

23. A system according to claim 21 wherein said solar tracking means includes means for selectively changing the fixed orientation of said panel with the sun between the fixed orientation in direct alignment with the sun and a fixed orientation out of direct alignment with the sun by a predetermined amount.

24. A system according to claim 21 wherein said solar tracking means includes means for determining whether or not direct sunlight is present at said panel.

25. A control assembly mounted for movement with a solar tracking type of panel which is mounted for movement about a fixed axis for tracking the position of the sun, said assembly comprising:

(a) means for detecting and indicating the position of said panel;

(b) means for indicating whether or not direct sunlight is present as viewed from said panel when the sun is within a limited section of the sky relative to said panel;

(c) means for indicating the position of the sun within said sector if direct sunlight if present; and (d) means for indicating if said panel is in precise predetermined orientation with the sun when the sun is in said sector if direct sunlight is present.

26. A tracking type of solar energy collection system, comprising:

(a) means including a panel member for collecting solar energy, said panel member being mounted for movement along a tracking path in order to maintain a predetermined, fixed orientation with the sun as the latter moves across the sky from an initial position following sunrise to a final position immediately preceding sunset;

(b) first means for placing said panel member in gross orientation with the sun from a position out of gross orientation therewith if direct sunlight is present at a first location spaced from said panel member at said first location and at a second location closer to said panel member;

(c) second means for placing said panel member in approximate orientation with the sun from a position in gross orientation therewith if direct sunlight is present; and (d) third means for placing said panel member in precise orientation with the sun from a position in approximate orientation therewith if direct sunlight is present at said first and second locations.

27. A stationary solar tracking apparatus for use in controlling the orientation of a solar collecting panel designed to track the sun's movement, said apparatus comprising stationary means positioned at a given location relative to said panel for detecting the presence or absence of direct sunlight at said location and, if direct sunlight is present, the position of the sun along its path, said detecting means including a plurality of separate means including separated photo detectors for sensing sunlight and distinguishing between direct sunlight and indirect sunlight so as to produce its own output signal characteristic of the position of the sun if direct sunlight is present and a different output signal indicating if direct sunlight is not present.

28. An apparatus according to claim 27 wherein said photo detectors are positioned relative to one another to monitor a predetermined sector of the sky through which the sun moves as the latter goes from sunrise to sunset.

29. An apparatus according to claim 28 wherein said detecting means includes means for electronically causing selective ones of said photo detectors to be inoperative for selectively varying the sector of the sky to be monitored.

30. A method of causing a solar collecting panel to track the sun, comprising the steps of:

(a) providing means including a panel member for collecting solar energy, said panel member being mounted for movement along a tracking path in order to maintain a predetermined, fixed orientation with the sun as the latter moves across the sky from an initial position following sunrise to a final position immediately preceding sunset;

(b) placing said panel member in gross orientation with the sun from a position out of gross orientation therewith if direct sunlight is present at a first location spaced from said panel member at said first location and at a second location closer to said panel member;

(c) placing said panel member in approximate orientation with the sun from a position in gross orientation therewith if direct sunlight is present; and (d) placing said panel member in precise orientation with the sun from a position in approximate orientation therewith if direct sunlight is present at said first and second locations.

* * * * *